United States Patent
Ranjbar (10) Patent No.: US 12,409,746 B2
(45) Date of Patent: Sep. 9, 2025

(54) SYSTEM AND METHOD FOR CHARGING VEHICLE'S HIGHER-VOLTAGE POWER SUPPLY USING LOWER-VOLTAGE CHARGING STATION

(71) Applicant: Canoo Technologies Inc., Torrance, CA (US)

(72) Inventor: Amir Ranjbar, Commerce Township, MI (US)

(73) Assignee: CANOO TECHNOLOGIES INC., Torrence, CA (US)

( * ) Notice: Subject to any disclaimer, the term of this patent is extended or adjusted under 35 U.S.C. 154(b) by 144 days.

(21) Appl. No.: 17/747,596

(22) Filed: May 18, 2022

(65) Prior Publication Data
US 2023/0398888 A1    Dec. 14, 2023

(51) Int. Cl.
*B60L 1/02*     (2006.01)
*B60L 53/22*    (2019.01)
(Continued)

(52) U.S. Cl.
CPC ............. *B60L 53/22* (2019.02); *B60L 1/02* (2013.01); *H02J 7/02* (2013.01); *H02M 1/0067* (2021.05);
(Continued)

(58) Field of Classification Search
CPC ........ B60L 53/22; B60L 1/02; B60L 2210/10; B60L 2210/30; B60L 53/14; H02J 7/02;
(Continued)

(56) References Cited

U.S. PATENT DOCUMENTS

| 7,598,703 B2 | 10/2009 | Zhang et al. |
| 10,505,455 B1 | 12/2019 | Biskup et al. |

(Continued)

OTHER PUBLICATIONS

Williams, "How the Boost PFC Converter Circuit Improves Power Quality," All About Circuits, Technical Article, Dec. 2016, 6 pages.
(Continued)

*Primary Examiner* — Elim Ortiz
(74) *Attorney, Agent, or Firm* — ALLEN, DYER, DOPPELT, + GILCHRIST, P.A.

(57) ABSTRACT

An apparatus includes an AC input configured to receive an AC electrical signal and a DC input configured to receive a first DC electrical signal having a lower voltage and a second DC electrical signal having a higher voltage. The apparatus also includes an on-board charger configured to charge a power supply using the AC electrical signal. The on-board charger includes an AC/DC PFC converter and a DC/DC converter. The apparatus further includes switches configured to form and break electrical connections between the AC input, DC input, AC/DC PFC converter, DC/DC converter, and power supply. In addition, the apparatus includes a controller configured to adjust the electrical connections formed by the switches. The controller is configured, when the DC input receives the first DC electrical signal, to place the switches in a configuration to couple the DC input to the PFC converter and couple the PFC converter to the power supply.

17 Claims, 8 Drawing Sheets

(51) Int. Cl.
  *H02J 7/02* (2016.01)
  *H02M 1/00* (2007.01)
  *H02M 1/42* (2007.01)
  *H02M 3/335* (2006.01)
  *H02M 7/217* (2006.01)

(52) U.S. Cl.
  CPC ..... *H02M 1/4225* (2013.01); *H02M 3/33507* (2013.01); *H02M 7/217* (2013.01); *B60L 2210/10* (2013.01); *B60L 2210/30* (2013.01); *H02J 2207/20* (2020.01)

(58) Field of Classification Search
  CPC .... H02J 2207/20; H02J 9/062; H02M 1/0067; H02M 1/4225; H02M 3/33507; H02M 7/217; Y02T 10/70; Y02T 10/7072; Y02T 90/14; Y02T 90/12; Y02E 60/10
  USPC ..... 307/9.1, 10.1, 65, 66; 320/104, 109, 128
  See application file for complete search history.

(56) References Cited

U.S. PATENT DOCUMENTS

| | | |
|---|---|---|
| 2013/0119932 A1 | 5/2013 | Moon et al. |
| 2013/0136910 A1 | 5/2013 | Numrich et al. |
| 2019/0168628 A1* | 6/2019 | Pfeilschifter ........... B60L 53/18 |
| 2020/0180452 A1 | 6/2020 | Lee et al. |
| 2021/0408889 A1* | 12/2021 | Zhu .......................... H02J 7/02 |
| 2022/0396167 A1* | 12/2022 | Sharifipour ............. B60L 53/60 |

OTHER PUBLICATIONS

International Search Report and Written Opinion of the International Searching Authority dated Sep. 19, 2023, in connection with International Application No. PCT/US2023/063336, 9 pages.

* cited by examiner

SYSTEM AND METHOD FOR CHARGING VEHICLE'S HIGHER-VOLTAGE POWER SUPPLY USING LOWER-VOLTAGE CHARGING STATION

TECHNICAL FIELD

This disclosure relates generally to electric vehicles. More specifically, this disclosure relates to a system and method for charging a vehicle's higher-voltage power supply using a lower-voltage charging station.

BACKGROUND

An electric vehicle includes a power supply (such as one or more battery modules) that provides electrical power to one or more electric motors and other components of the electric vehicle. The power supplies being used in electric vehicles have been generally increasing in voltage level over time. For example, earlier electric vehicles often used power supplies that provided around 400 volts, and the current trend is to use power supplies that provide around 800 volts. It is expected that this trend will continue and that even higher-voltage power supplies will be developed and used in electric vehicles.

SUMMARY

This disclosure relates to a system and method for charging a vehicle's higher-voltage power supply using a lower-voltage charging station.

In a first embodiment, an apparatus includes an alternating current (AC) input configured to receive an AC electrical signal and a direct current (DC) input configured to receive a first DC electrical signal having a lower voltage and a second DC electrical signal having a higher voltage. The apparatus also includes an on-board charger configured to charge a power supply using the AC electrical signal, where the on-board charger includes an AC/DC power factor correction (PFC) converter and a DC/DC converter. The apparatus further includes switches configured to selectively form and break electrical connections between the AC input, the DC input, the AC/DC PFC converter, the DC/DC converter, and the power supply. In addition, the apparatus includes a controller configured to adjust the electrical connections formed by the switches. The controller is configured, when the DC input receives the first DC electrical signal having the lower voltage, to place the switches in a first configuration to couple the DC input to the AC/DC PFC converter and couple the AC/DC PFC converter to the power supply.

In a second embodiment, an electric vehicle includes at least one electric motor and a power supply configured to provide electrical energy to the at least one electric motor. The electric vehicle also includes an AC input configured to receive an AC electrical signal and a DC input configured to receive a first DC electrical signal having a lower voltage and a second DC electrical signal having a higher voltage. The electric vehicle further includes an on-board charger configured to charge the power supply using the AC electrical signal, where the on-board charger includes an AC/DC PFC converter and a DC/DC converter. The electric vehicle also includes switches configured to selectively form and break electrical connections between the AC input, the DC input, the AC/DC PFC converter, the DC/DC converter, and the power supply. In addition, the electric vehicle includes a controller configured to adjust the electrical connections formed by the switches. The controller is configured, when the DC input receives the first DC electrical signal having the lower voltage, to place the switches in a first configuration to couple the DC input to the AC/DC PFC converter and couple the AC/DC PFC converter to the power supply.

In a third embodiment, a method includes determining whether an AC input is receiving an AC electrical signal, a DC input is receiving a first DC electrical signal having a lower voltage, or the DC input is receiving a second DC electrical signal having a higher voltage. The method also includes, based on the determination, controlling switches to selectively form and break electrical connections between the AC input, the DC input, an AC/DC PFC converter of an on-board charger, a DC/DC converter of the on-board charger, and a power supply. Controlling the switches includes, when the DC input receives the first DC electrical signal having the lower voltage, placing the switches in a first configuration to couple the DC input to the AC/DC PFC converter and couple the AC/DC PFC converter to the power supply.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 8, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

As noted above, an electric vehicle includes a power supply (such as one or more battery modules) that provides electrical power to one or more electric motors and other components of the electric vehicle. The power supplies being used in electric vehicles have been generally increasing in voltage level over time. For example, earlier electric vehicles often used power supplies that provided around 400 volts, and the current trend is to use power supplies that provide around 800 volts. It is expected that this trend will continue and that even higher-voltage power supplies will be developed and used in electric vehicles.

Increasing the voltage level of a power supply typically decreases the amount of electrical current that is needed to provide power to the components of an electric vehicle. Lowering the amount of electrical current used in an electric vehicle can provide various advantages. For instance, lower electrical currents typically suffer from smaller losses when being transported over copper wiring or other wiring, and smaller electrical losses can result in improved powertrain system efficiency and increase the driving range of an electric vehicle. Lower electrical currents can also reduce the amount of copper or other materials used in an electric vehicle's wiring, which can reduce the weight and cost of the electric vehicle.

Despite the desire to use higher-voltage power supplies in electric vehicles, a major problem exists with direct current (DC) charging stations that are used around the world to charge electric vehicles' power supplies. More specifically, DC fast charging (DCFC) stations are used at numerous locations to allow users to rapidly charge their electric vehicles' power supplies. Most DCFC stations installed across the globe are currently designed to charge electric vehicle power supplies to around 400 volts. A 400-volt charging station cannot directly charge a higher-voltage power supply, such as a power supply designed to operate at 800 volts. This is because the higher-voltage power supply would have a higher voltage than the charging station, which would prevent an electrical current from flowing from the charging station to the electric vehicle's power supply.

Various approaches have been proposed to overcome these problems, but these approaches can suffer from various shortcomings. For example, one approach divides a higher-voltage power supply into multiple lower-voltage power supplies coupled in series. When an electric vehicle is coupled to a lower-voltage charging station, the lower-voltage power supplies are electrically separated from each other by breaking their series connection and are electrically coupled in parallel to the lower-voltage charging station. This approach allows the lower-voltage charging station to charge the lower-voltage power supplies since each lower-voltage power supply is independently connected to the charging station. However, this approach requires the use of separate voltage bus bars and additional junction boxes to house various components, which can increase the size, weight, and cost of the electric vehicle. Moreover, an electrical switch is used to selectively break the series connection between the lower-voltage power supplies during charging by a lower-voltage charging station. If that electrical switch fails and remains closed when it should be opened, this can create a catastrophic fault that may lead to severe damage to the electric vehicle or even injury or death to any occupants. In addition, components of the electric vehicle that are designed to use a higher voltage during operation (such as heating, air conditioning, and ventilation or "HVAC" compressors or heaters) may operate poorly or not at all when the electric vehicle's power supply is being charged using a lower-voltage charging station. This may, for instance, prevent usage of the electric vehicle's air conditioning during summer or the electric vehicle's heater during winter. While it is possible to provide a boost converter that increases the voltage provided to these components when the electric vehicle's power supply is being charged using a lower-voltage charging station, this again increases the size, weight, and cost of the electric vehicle.

Another approach involves the use of an extra boost converter that can be selectively switched into and out of the path of an electrical current being provided to an electric vehicle's power supply during charging. The boost converter can be switched out of the path when the electric vehicle's power supply is being charged by a higher-voltage charging station, and the boost converter can be switched into the path when the electric vehicle's power supply is being charged by a lower-voltage charging station. However, the extra boost converter can be relatively large and heavy, which increases the size, weight, and cost of the electric vehicle. Also, if the electric vehicle is used in an area where there are few or no lower-voltage charging stations, the electric vehicle is forced to continue carrying the extra boost converter even though the extra boost converter is rarely or never used.

Still another approach involves using an inverter and a motor winding of an electric motor in an electric vehicle to provide boost functionality when the electric vehicle is coupled to a lower-voltage charging station. While this approach can reduce or eliminate the need for an extra stand-alone boost converter, this approach may require major changes to existing electric motors used in electric vehicles. For example, this approach generally requires that the electric motor used in an electric vehicle make its neutral electrical lead available for use outside of the electric motor. This is typically not a standard design feature of electric motors used in electric vehicles and can lead to manufacturing difficulties. Moreover, the electric motors used in electric vehicles are not designed primarily to perform a voltage boost function, so the electric motors are not optimized to perform voltage boosting. Because of this, electric motors generally do not perform voltage boosting with high efficiencies. For instance, DC flux in a motor core can introduce challenges, such as core saturation, which increase system losses and reduce system performance. In addition, this approach may require the use of an additional junction box, which can increase the size, weight, and cost of the electric vehicle.

This disclosure provides a system and method for charging a vehicle's higher-voltage power supply using a lower-voltage charging station. As described in more detail below, the approaches described in this patent disclosure use one or more components of a vehicle's hardware designed for alternating current (AC) charging in order to charge the vehicle's higher-voltage power supply if and when the vehicle is coupled to a lower-voltage DC charging station. For example, the vehicle's hardware that is designed for AC charging is often referred to as an on-board charger (OBC), and the on-board charger often includes an AC/DC power factor correction (PFC) converter and a DC/DC converter that is used for changing the voltage level of a DC voltage produced from an AC input. The described approaches allow the PFC converter of the on-board charger to be used when the vehicle is coupled to a lower-voltage charging station, and the DC/DC converter of the on-board charger can be bypassed when the PFC converter is being used in this manner.

The approaches described in this patent disclosure support the use of electrical switches to controllably reconfigure the electrical pathways in the vehicle. The vehicle's electrical pathways can therefore be configured in different ways depending on how the vehicle's power supply is being charged. For example, when the vehicle's power supply is being charged using an AC power source, the vehicle's electrical pathways can be configured to allow electrical energy from an AC input to flow through the vehicle's on-board charger (including both the AC/DC PFC converter and the DC/DC converter) in order to charge the vehicle's power supply. In this mode, the AC/DC PFC converter can be used to provide power factor correction. When the vehicle's power supply is being charged using a higher-voltage DC charging station, the vehicle's electrical pathways can be configured to allow electrical energy from a DC input to flow into the vehicle's power supply (without flowing through the on-board charger) in order to charge the vehicle's power supply. When the vehicle's power supply is being charged using a lower-voltage DC charging station, the vehicle's electrical pathways can be configured to allow electrical energy from the DC input to flow through the AC/DC PFC converter of the vehicle's on-board charger (but not through the DC/DC converter of the vehicle's on-board charger) in order to charge the vehicle's power supply. In this mode, the AC/DC PFC converter can be used to provide voltage boosting.

In this way, these approaches allow for charging of a vehicle's higher-voltage power supply under various scenarios, including when the vehicle's power supply is being charged using a lower-voltage charging station. This can be accomplished using the boost functionality provided by the vehicle's on-board charger, rather than using a stand-alone boost converter or an inverter and motor winding, when the vehicle's power supply is being charged using a lower-voltage charging station. These approaches can therefore achieve reduced size, weight, and cost compared to various prior approaches. Also, the PFC converter in the vehicle's on-board charger is typically designed to achieve high efficiencies, so the PFC converter in the vehicle's on-board charger is generally much more efficient in providing boost functionality compared to using an inverter and a motor winding of an electric motor. Further, these approaches can avoid the need to have access to an electric motor's neutral lead, which can avoid associated manufacturing difficulties. In addition, the PFC converter in the vehicle's on-board charger can be used for both AC charging and lower-voltage DC charging of the vehicle's power supply, which can increase the utilization rate of the PFC converter in the vehicle's on-board charger.

Figure 1:
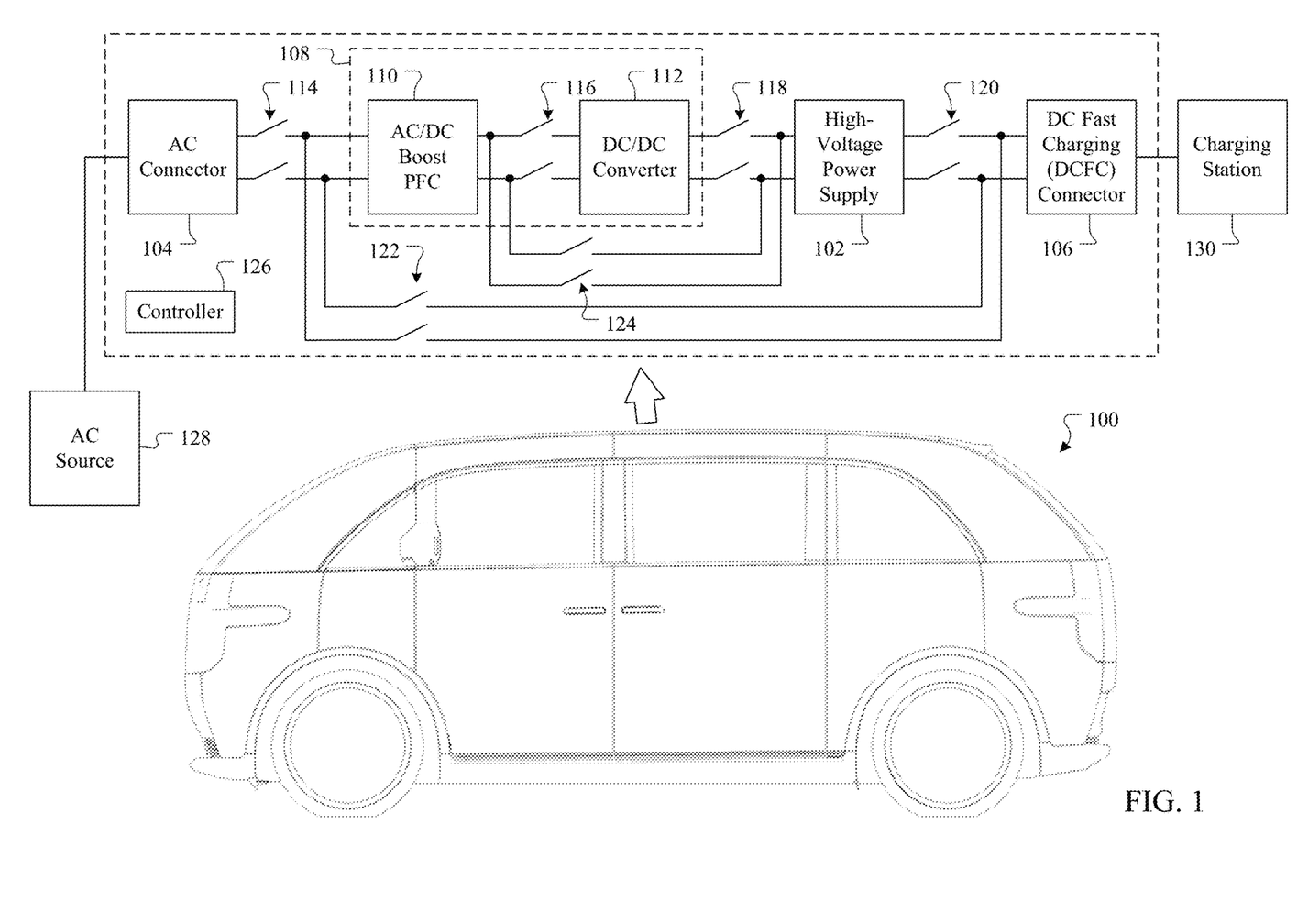
FIG. 1 illustrates an example vehicle supporting charging of the vehicle's higher-voltage power supply using a lower-voltage charging station according to this disclosure.

FIG. 1 illustrates an example vehicle 100 supporting charging of the vehicle's higher-voltage power supply using a lower-voltage charging station according to this disclosure. In this particular example, the vehicle 100 takes the form of an automotive vehicle, such as an electric or other passenger vehicle. However, any other suitable electric vehicle may be used here. Also, in this particular example, the vehicle 100 has the form of a passenger van, but other forms may be used by the vehicle 100, such as a sedan, pickup truck, sport utility vehicle, box van, or semi tractor form.

As shown in FIG. 1, the vehicle 100 includes at least one high-voltage power supply 102. The power supply 102 is generally used to provide DC electrical power to other components of the vehicle 100. For example, the power supply 102 may be used to provide electrical power to one or more electric motors that can be used to move the vehicle 100 forward or backward, one or more HVAC system components (such as a compressor or heater and blower), and various electrical accessories in the vehicle 100. The power supply 102 includes any suitable source of electrical power that can provide electrical energy at a relatively high voltage, such as an 800-volt battery module or other 800-volt nominal power supply.

In this example, the power supply 102 can be charged in various ways. For example, the power supply 102 may be charged using an AC electrical signal received via an AC input 104. The AC input 104 generally represents a connector that can be coupled to an AC power source 128. For example, the AC input 104 may represent a connector that can be coupled via an electrical cable to receive power from an AC power grid. In some cases, the AC input 104 is provided in the vehicle 100 in order to allow the vehicle 100 to be coupled to an AC outlet in a user's home or other location for recharging of the power supply 102. The power supply 102 may also be charged using a DC electrical signal received via a DCFC input 106. The DCFC input 106 generally represents a connector that can be coupled to a DC power source. For instance, the DCFC input 106 may represent a connector that can be coupled via an electrical cable to receive power from a charging station 130. In some cases, the DCFC input 106 is provided in the vehicle 100 in order to allow the vehicle 100 to be coupled to a DC charging station (either in the user's home or other location) for rapid recharging of the power supply 102. Each input 104, 106 includes any suitable structure configured to be coupled via an electrical cable or other mechanism to a suitable power source.

The vehicle 100 also includes an on-board charger 108, which is normally used for converting the AC electrical signal received via the AC input 104 into a suitable DC voltage (which is used as described below to support charging of the power supply 102 by a lower-voltage charging station 130 in accordance with this disclosure). The on-board charger 108 here includes a cascaded pair of converters, namely an AC/DC PFC converter 110 and a DC/DC converter 112. When the power supply 102 is being recharged using an AC power source 128, the AC/DC PFC converter 110 generally operates to convert an AC electrical signal into a DC electrical signal. The AC/DC PFC converter 110 performs this function while increasing the voltage level of the DC electrical signal relative to the voltage level of the AC electrical signal (thereby providing a voltage "boost"). In addition, the AC/DC PFC converter 110 performs this function while providing power factor correction. Power factor correction refers to operation that increases the power factor of a load (the vehicle 100), which helps to improve the efficiency of the AC distribution system to which the vehicle 100 is attached. Since the PFC converter 110 can perform power factor correction while boosting the voltage, the PFC converter 110 is often referred to as a boost PFC converter. The AC/DC PFC converter 110 includes any suitable structure configured to convert AC electrical energy into DC electrical energy while increasing the voltage of the DC electrical energy and providing power factor correction.

The DC/DC converter 112 generally operates to convert a DC output voltage produced by the AC/DC PFC converter 110 into a suitable DC voltage for recharging the power supply 102. As a result, the DC/DC converter 112 regulates the DC output voltage from the AC/DC PFC converter 110 so that the regulated. DC voltage is suitable for use in recharging the power supply 102. The DC/DC converter 112 can also operate to electrically isolate the power supply 102 from the AC/DC PFC converter 110. In some embodiments, the DC/DC converter 112 may provide a DC voltage that is around 800 volts to the power supply 102. The DC/DC converter 112 includes any suitable structure configured to convert one DC voltage into another DC voltage.

The vehicle 100 further includes various switches 114-124, which are used to reconfigure the electrical pathways in the vehicle 100 to support various charging modes for the power supply 102. More specifically, the switches 114-124 here can be used to permit the power supply 102 to be recharged using an AC electrical signal received via the AC input 104, a higher-voltage DC electrical signal received via the DCFC input 106, or a lower-voltage DC electrical signal received via the DCFC input 106. Note that the phrase "lower-voltage" is used in this patent disclosure to refer to a DC voltage that is lower than the nominal DC voltage provided by the power supply 102, and the phrase "higher-voltage" is used in this patent disclosure to refer to a DC voltage that is higher than the voltage of the power supply 102 (at least prior to charging of the power supply 102 using the DC electrical signal received via the DCFC input 106). In some embodiments, it is assumed that a lower-voltage DC voltage is around 400 volts and that a higher-voltage DC voltage is around 800 volts. However, other voltage values may be used depending on (among other things) the voltage of the power supply 102 in the vehicle 100 and the voltage provided by a charging station 130.

In this particular example, the switches 114 can be used to selectively form and break an electrical connection between the AC input 104 and the AC/DC PFC converter 110, and the switches 116 can be used to selectively form and break an electrical connection between the AC/DC PFC converter 110 and the DC/DC converter 112. Also, the switches 118 can be used to selectively form and break an electrical connection between the DC/DC converter 112 and the power supply 102, and the switches 120 can be used to selectively form and break an electrical connection between the DCFC input 106 and the power supply 102. In addition, the switches 122 can be used to selectively form and break an electrical connection between the DCFC input 106 and the AC/DC PFC converter 110, and the switches 124 can be used to selectively form and break an electrical connection between the AC/DC PFC converter 110 and the power supply 102. Each of the switches 114-124 represents any suitable structure configured to selectively form and break an electrical connection, such as a MOSFET transistor, other transistor, contactor, circuit breaker, etc.

In this example, the switches 114-124 can be controlled using at least one controller 126. For example, the controller 126 may use inputs from one or more sensors to detect if and when the vehicle 100 is connected to an AC power source, a higher-voltage DC power source, or a lower-voltage DC power source. The controller 126 may use these inputs in order to determine which switches 114-124 should be opened and which switches 114-124 should be closed in order to support proper recharging of the power supply 102 based on the detected power source. The controller 126 includes any suitable structure configured to control the operation of electrical switches (and optionally other components) of the vehicle 100. As particular examples, the controller 126 may represent at least one microprocessor, microcontroller, digital signal processor (DSP), application specific integrated circuit (ASIC), field programmable gate array (FPGA), or discrete circuitry.

Figure 2:
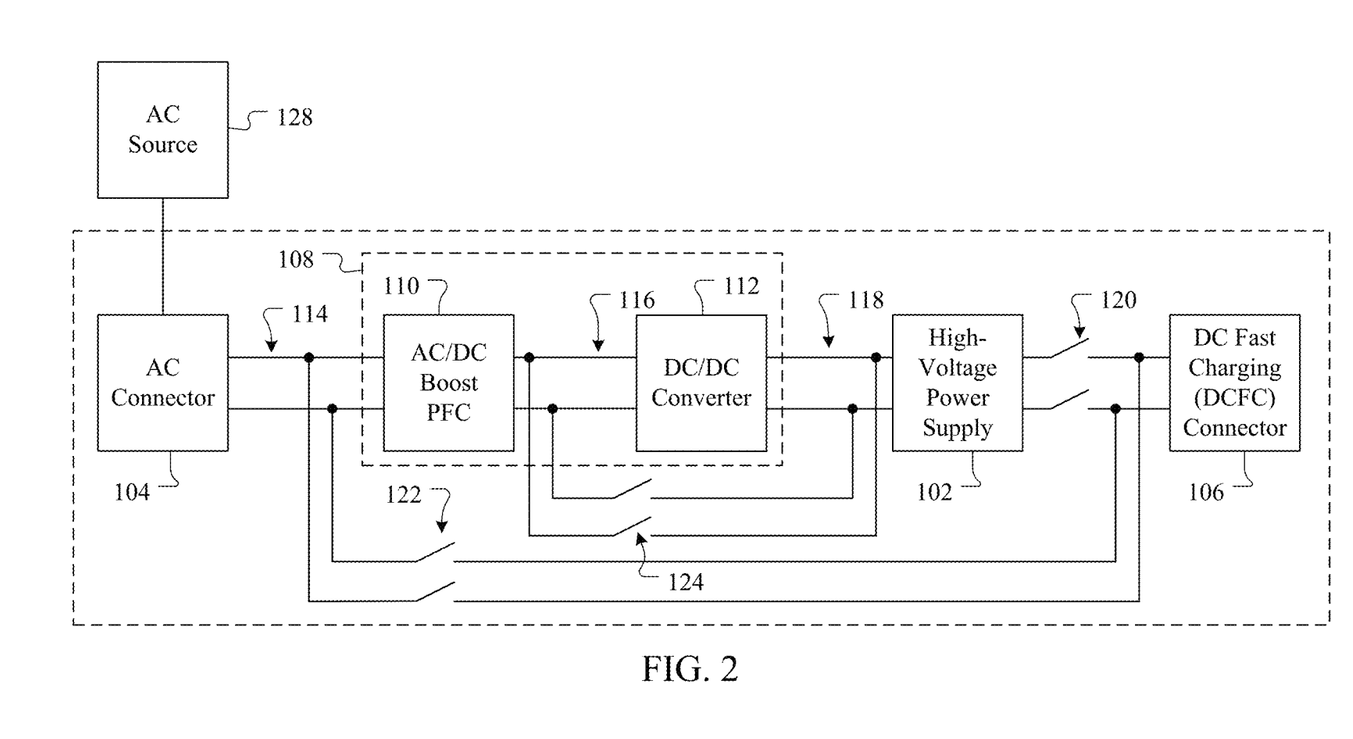
FIGS. 2 through 4 illustrate example configurations of a vehicle during charging of the vehicle's power supply using different sources of electrical power according to this disclosure.
Figure 3:
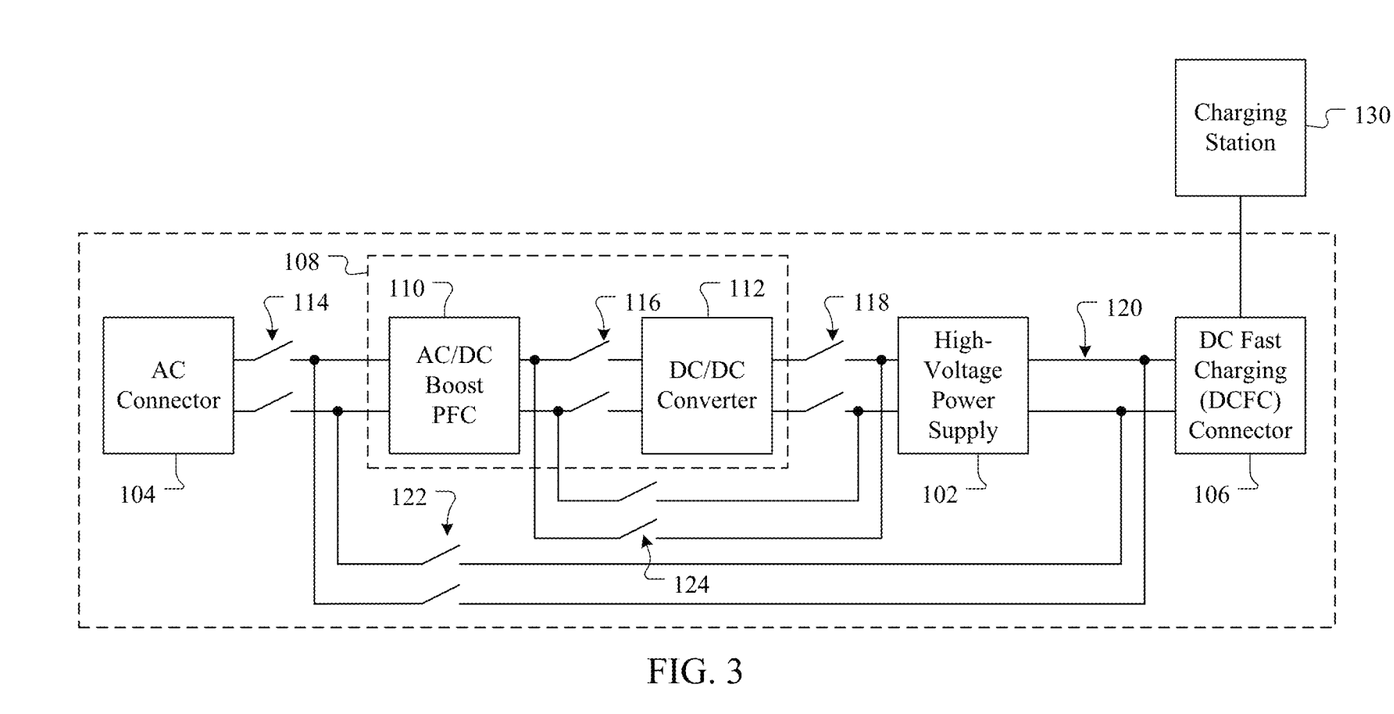
Figure 4:
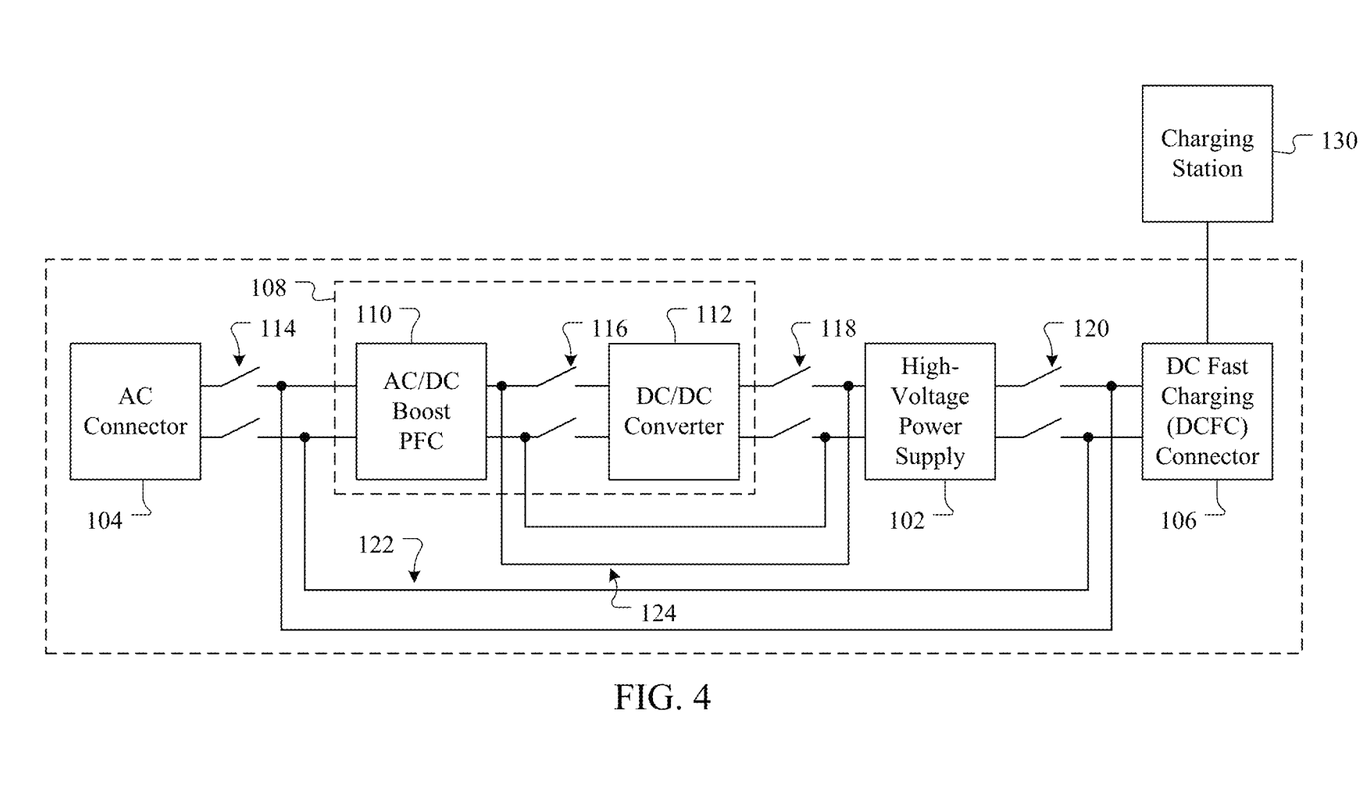

FIGS. 2 through 4 illustrate example configurations of the vehicle 100 during charging of the vehicle's power supply 102 using different sources of electrical power according to this disclosure. As shown in FIG. 2, it is assumed here that the vehicle 100 is coupled to an AC power source 128 and is therefore receiving an AC electrical signal via the AC input 104. In this configuration, the power supply 102 is charged using the incoming AC electrical signal, so the switches 114, 116, 118 are closed and the switches 120-124 are opened. This configuration allows the AC electrical signal to pass from the AC input 104 into the on-board charger 108, where the AC/DC PFC converter 110 and the DC/DC converter 112 collectively operate to convert the AC electrical signal into a higher-voltage DC signal suitable for charging the power supply 102.

As shown in FIG. 3, it is assumed here that the vehicle 100 is coupled to a higher-voltage DC power source (such as a higher-voltage charging station 130) and is therefore receiving a higher-voltage DC electrical signal via the DCFC input 106. In this configuration, the power supply 102 is charged using the incoming higher-voltage DC electrical signal, so the switches 120 are closed and the switches 114-118, 122-124 are opened. This configuration allows the higher-voltage DC electrical signal to pass from the DCFC input 106 to the power supply 102 for charging of the power supply 102.

As shown in FIG. 4, it is assumed here that the vehicle 100 is coupled to a lower-voltage DC power source (such as a lower-voltage charging station 130) and is therefore receiving a lower-voltage DC electrical signal via the DCFC input 106. In this configuration, the power supply 102 is charged using the incoming lower-voltage DC electrical signal, so the switches 114-120 are opened and the switches 122-124 are closed. This configuration allows the lower-voltage DC electrical signal to pass from the DCFC input 106 into the AC/DC PFC converter 110, which is functioning in this configuration as a DC/DC boost circuit and which converts the lower-voltage DC electrical signal into a higher-voltage DC electrical signal suitable for charging the power supply 102. Effectively, this configuration activates the front-end of the on-board charger 108 (the PFC converter 110) when the vehicle 100 is coupled to a lower-voltage charging station 130 in order to boost the incoming DC voltage to a higher DC voltage that is suitable for charging the power supply 102. The back-end of the on-board charger 108 (the DC/DC converter 112) that provides isolation and voltage regulation may remain disconnected from the electrical pathway of the DC voltage when the vehicle is coupled to a lower-voltage charging station 130, and the lower-voltage charging station 130 can have this isolation embedded internal to its architecture (so the isolation is not required from the vehicle side).

As can be seen in FIGS. 2 through 4, the power supply 102 in the vehicle 100 can be charged regardless of whether the vehicle 100 is connected to an AC power source, a higher-voltage DC power source, or a lower-voltage DC power source. Moreover, when the vehicle 100 is connected to a lower-voltage DC power source, the power supply 102 in the vehicle 100 can be charged by passing the incoming DC electrical signal through the PFC converter 110 of the on-board charger 108 (which is normally used only during AC charging) in order to increase the voltage level of the DC signal to a suitably-high voltage level. This allows for charging of the power supply 102 using both lower-voltage and higher-voltage charging stations 130 without requiring the use of a separate boost converter and without requiring the use of a motor winding of an electric motor of the vehicle 100.

Although FIG. 1 illustrates one example of a vehicle 100 supporting charging of the vehicle's higher-voltage power supply 102 using a lower-voltage charging station 130 and FIGS. 2 through 4 illustrate examples of configurations of the vehicle 100 during charging of the vehicle's power supply 102 using different sources of electrical power, various changes may be made to FIGS. 1 through 4. For example, various components shown in FIGS. 1 through 4 may be combined, further subdivided, replicated, omitted, or rearranged and additional components may be added according to particular needs. Also, components in electrical circuits can often be positioned and electrically connected in various ways, so the specific electrical pathways and the associated switches 114-124 shown in FIGS. 1 through 4 are for illustration and explanation only. Other embodiments of the vehicle 100 may include fewer or more electrical pathways and fewer or more associated switches in order to support reconfiguration of the vehicle 100 based on the specific source of electrical energy being used to charge the power supply 102. As a particular example of this, while pairs of electrical switches are shown here, certain components of the vehicle 100 may be coupled to a common ground connection. As a result, single electrical switches (rather than pairs of electrical switches) may be used to form and break electrical connections to or from those components since those components may remain permanently coupled to the common ground connection (meaning electrical switches may not be needed to selectively couple those components to ground).

Figure 5:
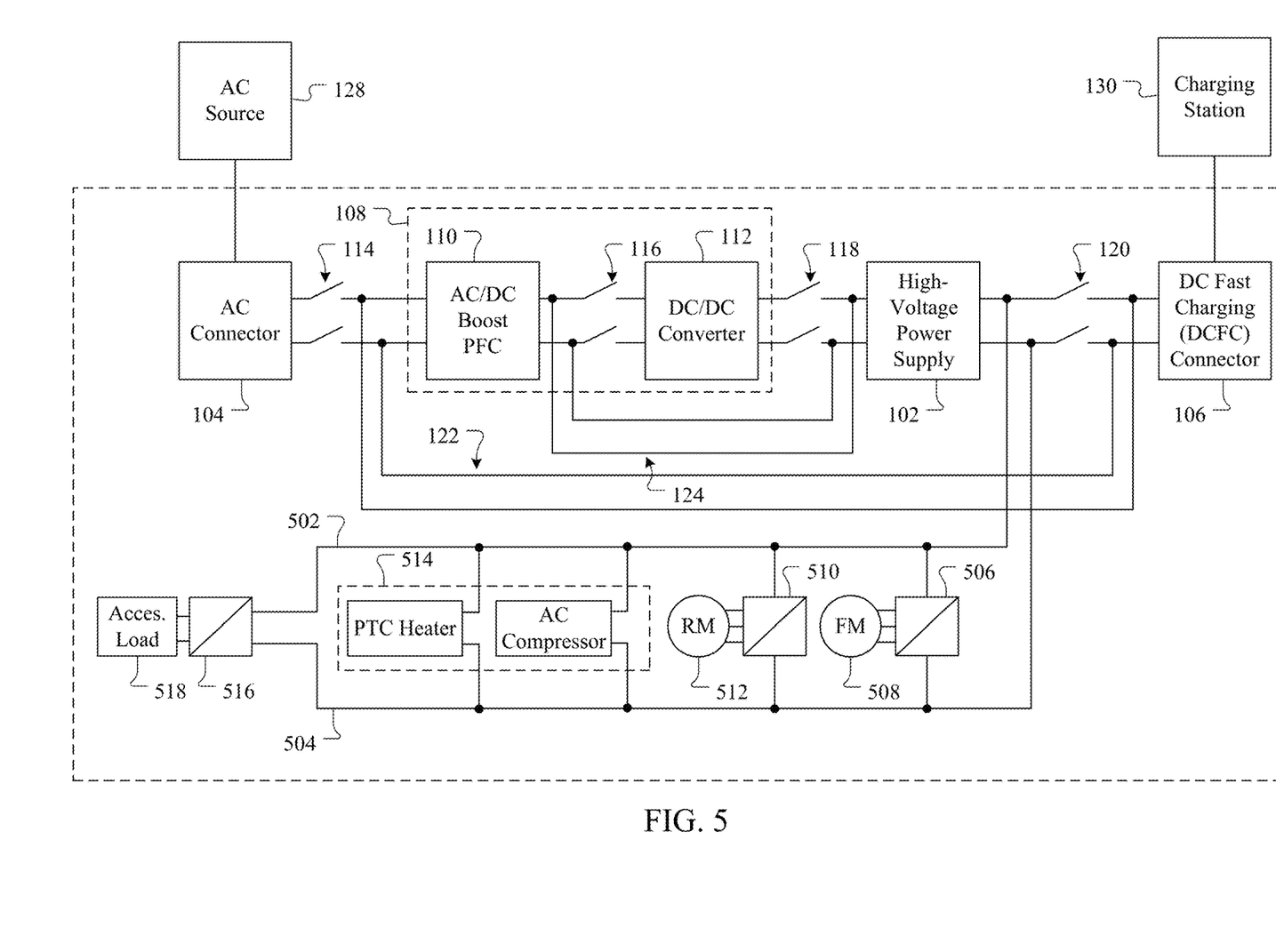
FIG. 5 illustrates a specific example implementation of a vehicle supporting charging of the vehicle's higher-voltage power supply using a lower-voltage charging station according to this disclosure.

FIG. 5 illustrates a specific example implementation of a vehicle 100 supporting charging of the vehicle's higher-voltage power supply 102 using a lower-voltage charging station 130 according to this disclosure. Note that one or more components of the vehicle 100 shown in FIGS. 1 through 4 are omitted from FIG. 5 for clarity. As shown in FIG. 5, the vehicle 100 includes the power supply 102, such as a battery like an 800-volt battery or battery module. Voltage rails 502 and 504 are used to electrically couple other components of the vehicle 100 to the power supply 102. The voltage rails 502 and 504 are often referred to as voltage bus bars.

In this example, the other components of the vehicle 100 coupled to the voltage rails 502 and 504 include at least one inverter 506 coupled to at least one front motor (FM) 508 of the vehicle 100 and/or at least one inverter 510 coupled to at least one rear motor (RM) 512 of the vehicle 100. Each motor 508, 512 represents an electric motor configured to impart rotational motion to one or more wheels of the vehicle 100. Unlike conventional internal combustion engine vehicles, electric vehicles can be designed with different numbers of electric motors at different locations of the electric vehicles. For instance, an electric vehicle may include a single electric motor driving its front wheels, multiple electric motors separately driving its front wheels, a single electric motor driving its rear wheels, multiple electric motors separately driving its rear wheels, or any suitable combination thereof. In FIG. 5, it is assumed that both front and rear motors 508, 512 and their associated inverters 506, 510 are used, but this need not be the case. Each inverter 506, 510 generally operates to convert a higher-voltage DC electrical signal from the power supply 102 into a suitable AC electrical signal for its associated motor 508, 512. In some cases, for instance, each inverter 506, 510 may convert an 800-volt DC electrical signal into a three-phase AC electrical signal.

The other components of the vehicle 100 coupled to the voltage rails 502 and 504 also include one or more components 514 that are designed to remain operational when the power supply 102 is being recharged (even if the vehicle 100 is coupled to a lower-voltage charging station 130). For example, the one or more components 514 may include an HVAC compressor or other HVAC components and a positive temperature coefficient (PTC) heater or other heater. These components may be designed to operate using higher voltage levels and can remain coupled to the power supply 102 during recharging of the power supply 102. Among other things, this can permit usage of the vehicle's air conditioning during summer and the vehicle's heater during winter, and the PTC heater can be used to heat the power supply 102 when the power supply 102 is charged during cold weather.

The other components of the vehicle 100 coupled to the voltage rails 502 and 504 further include one or more components that may or may not remain operational when the power supply 102 is being recharged. Here, these components include at least one DC/DC converter 516, and each DC/DC converter 516 may be coupled to at least one accessory load 518. Each DC/DC converter 516 is configured to convert the DC voltage from the power supply 102 into a different DC voltage for the associated accessory load(s) 518. As a particular example, each DC/DC converter 516 may be configured to convert an 800-volt DC electrical signal from the power supply 102 into a 12-volt DC electrical signal for the associated accessory load(s) 518. The accessory loads 518 can represent various accessories of the vehicle 100, such as a radio, entertainment system, navigation system, or other accessories.

Although FIG. 5 illustrates one specific example of an implementation of a vehicle 100 supporting charging of the vehicle's higher-voltage power supply 102 using a lower-voltage charging station 130, various changes may be made to FIG. 5. For example, various components shown in FIG. 5 may be combined, further subdivided, replicated, omitted, or rearranged and additional components may be added according to particular needs. As a particular example, the specific number of motors, inverters, converters, accessory loads, and other components of FIG. 5 can easily vary depending on the implementation.

Figure 6:
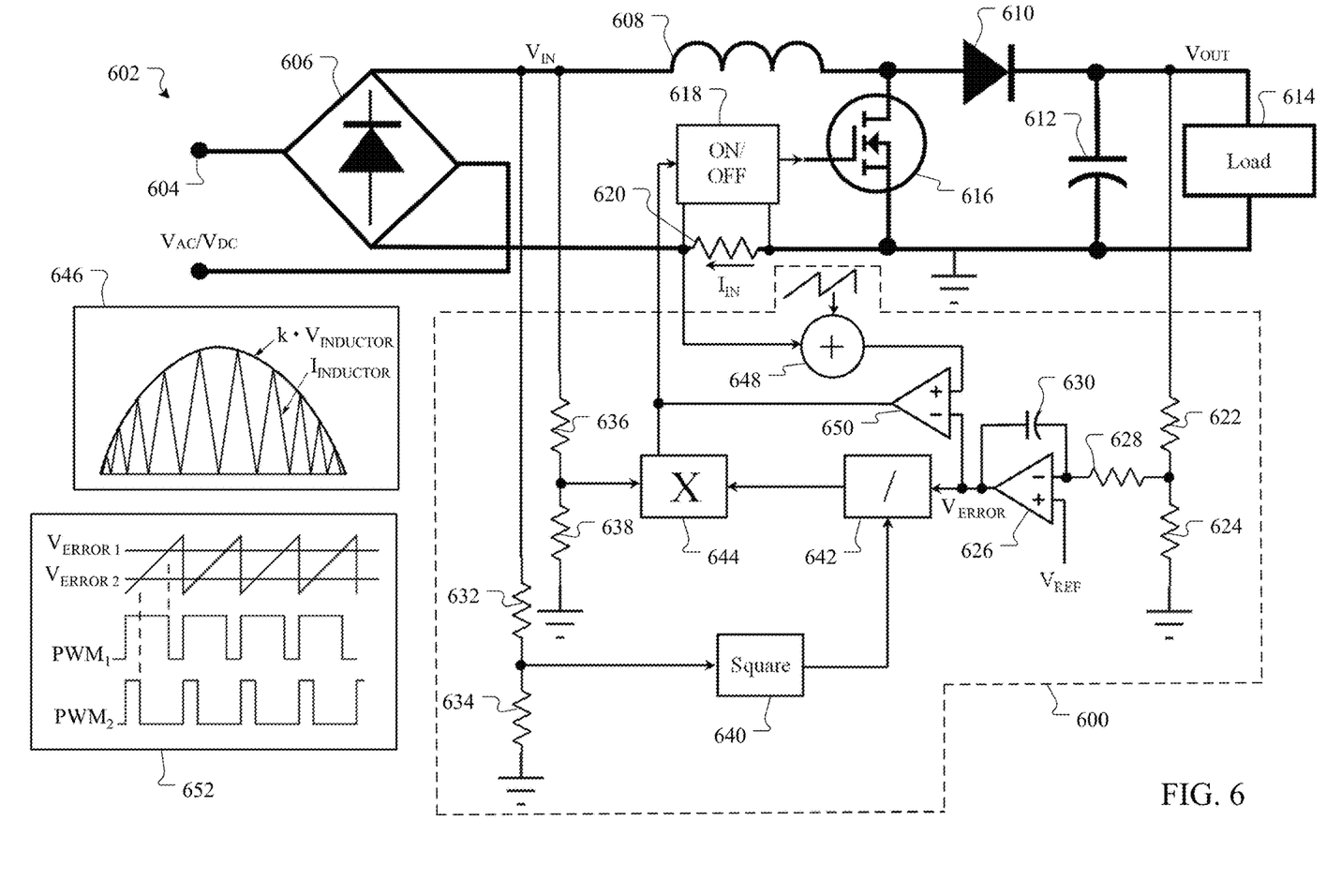
FIG. 6 illustrates an example control system for controlling charging of a vehicle's power supply according to this disclosure.

FIG. 6 illustrates an example control system 600 for controlling charging of a vehicle's power supply 102 according to this disclosure. For ease of explanation, the control system 600 shown in FIG. 6 is described as being used in the vehicle 100 of FIG. 1. As a particular example, the control system 600 may be used within or as part of the controller 126 in the vehicle 100. However, the control system 600 may be used in any other suitable vehicle designed in accordance with the teachings of this disclosure.

As shown in FIG. 6, the AC/DC PFC converter 110 in this example of the vehicle 100 is represented using a boost PFC converter circuit 602, which includes input terminals 604 configured to receive an AC voltage ($V_{AC}$) or a DC voltage ($V_{DC}$) depending on how the power supply 102 is being recharged. The AC or DC voltage is provided to a rectifier 606, such as four diodes connected in a square arrangement. The rectifier 606 outputs an input voltage ($V_{IN}$), which represents the DC voltage $V_{DC}$ or a rectified version of the AC voltage $V_{AC}$. The input voltage $V_{IN}$ is provided to an inductor 608, which is coupled in series with a diode 610. The diode 610 is coupled to an output capacitor 612, which is coupled in parallel with a load 614 (such as the DC/DC converter 112 or the power supply 102). A switch 616 (such as a MOSFET or other transistor) is coupled to a node between the inductor 608 and the diode 610 and to ground. The switch 616 can be closed in order to charge the inductor 608 without having electrical current pass through the diode 610, capacitor 612, and load 614. A pulse width modulation (PWM) or on-off controller 618 controls whether the switch 616 is conductive (closed) or non-conductive (opened) in order to control the operation of the boost PFC converter circuit 602. A sense resistor 620 can be used to generate a sense voltage based on an electrical current flowing through the inductor 608 ($I_{IN}$ or $I_{INDUCTOR}$), and the sense voltage is used as an input to the on-off controller 618.

The control system 600 shown in FIG. 6 can be used to control the boost PFC converter circuit 602 depending on whether the boost PFC converter circuit 602 is being used with an AC voltage $V_{AC}$ (during charging of the power supply 102 using an AC power source 128) or a lower-voltage DC input voltage $V_{DC}$ (during charging of the power supply 102 using a lower-voltage charging station 130). When used with an AC voltage $V_{AC}$, the control system 600 can control the boost PEC converter circuit 602 to provide power factor correction. When used with a lower-voltage DC input voltage $V_{DC}$, the control system 600 can control the boost PFC converter circuit 602 to provide voltage boosting of the lower-voltage DC input voltage $V_{DC}$.

In this example, the control system 600 includes two resistors 622 and 624 forming a first voltage divider, which is used to divide an output voltage ($V_{OUT}$) being provided by the boost PFC converter circuit 602 to the load 614. An operational amplifier 626, a resistor 628, and a capacitor 630 collectively form an error amplifier that outputs an error signal ($V_{ERROR}$) based on a difference between the voltage from the first voltage divider and a reference voltage ($V_{REF}$). The error signal $V_{ERROR}$ is used to control the boost PFC converter circuit 602 during power factor correction and during voltage boosting.

To provide control for power factor correction, the control system 600 includes two resistors 632, 634 forming a second voltage divider and two resistors 636, 638 forming a third voltage divider. Each of the second and third voltage dividers is used to divide the input voltage $V_{IN}$. The voltage generated by the second voltage divider may be defined as $K_{1\times}V_{IN}$, where $K_1$ represents a value defined by the resistances of the resistors 632, 634. The voltage generated by the second voltage divider is provided to a square function 640, which squares the voltage generated by the second voltage divider. The voltage generated by the square function 640 may be defined as $K_{2\times}V_{IN}^2$, where $K_2$ represents the value of $K_1$ squared. The voltage generated by the square function 640 and the error signal $V_{ERROR}$ are provided to a division function 642, which divides the error signal $V_{ERROR}$ by the voltage from the square function 640. The voltage generated by the division function 642 may be defined as $K_3 \times V_{ERROR}/V_{IN}^2$, where $K_3$ represents the inverse of $K_2$. The voltage generated by the third voltage divider may be defined as $K_4 \times V_{IN}$, where $K_4$ represents a value defined by the resistances of the resistors 636, 638. The voltage from the third voltage divider and the voltage from the division function 642 are provided to a multiplication function 644, which multiplies the voltage from the third voltage divider and the voltage from the division function 642. The voltage generated by the multiplication function 644 may be defined as $K_5 \times V_{ERROR}/V_{IN}$, where $K_5$ represents the product of $K_3$ and $K_4$. The voltage generated by the multiplication function 644 is provided to the on-off controller 618 for use in controlling the operation of the switch 616. For example, signals 646 represent how the on-off controller 618 can control the operation of the switch 616 so that the average current through the inductor 608 is substantially in phase with the voltage across the inductor 608 (indicating a good power factor). These operations allow the control system 600 to optimize the boost PFC converter circuit 602 for use in performing power factor correction. This represents one control loop that is used in the control system 600.

To provide control for voltage boosting, the control system 600 includes an adder 648 and a comparator 650. The adder 648 combines a voltage measured at the sense resistor 620 with a sawtooth voltage, meaning a voltage that linearly increases from a lowest level (such as 0 volts) to a maximum level before resetting back to the lowest level. The comparator 650 compares the output of the adder 648 with the error signal $V_{ERROR}$ and generates a voltage that is provided to the on-off controller 618 for use in controlling the operation of the switch 616. Here, the error signal $V_{ERROR}$ is used as a threshold, and the comparator 650 operates to indicate when the output of the adder 648 exceeds the threshold. Signals 652 represent how the on-off controller 618 can control the operation of the switch 616 to provide voltage boosting when the vehicle 100 is being charged using a lower-voltage charging station 130. Here, the $V_{ERROR\ 1}$ and $V_{ERROR\ 2}$ signals represent different values of the error signal $V_{ERROR}$ (different error thresholds), where the output of the adder 648 is superimposed on these error thresholds. The $PWM_1$ and $PWM_2$ signals indicate how the output from the on-off controller 618 can vary, and it can be seen that the on-off controller 618 turns the switch 616 on for longer periods of time when the threshold (represented by $V_{ERROR}$) is higher and for shorter periods of time when the threshold is lower. These operations allow the control system 600 to optimize the boost PFC converter circuit 602 for use in voltage boosting of a lower-voltage DC input signal. This represents another control loop that is used in the control system 600.

Note that many of the operations shown in FIG. 6 may be implemented using any suitable hardware or any suitable combination of hardware and software/firmware instructions. In some embodiments, for instance, some of the operations shown in FIG. 6 can be embodied as software or firmware instructions that are executed by one or more unitary or multi-core central processing units or other processing device(s). In other embodiments, these operations can be implement using hardware components. In general, this disclosure is not limited to any particular physical implementation of the control system 600.

Although FIG. 6 illustrates one example of a control system 600 for controlling charging of a vehicle's power supply 102, various changes may be made to FIG. 6. For example, various components shown in FIG. 6 may be combined, further subdivided, replicated, omitted, or rearranged and additional components may be added. according to particular needs. Also, any other suitable control system may be used to control one or more operations of a vehicle 100.

Figure 7:
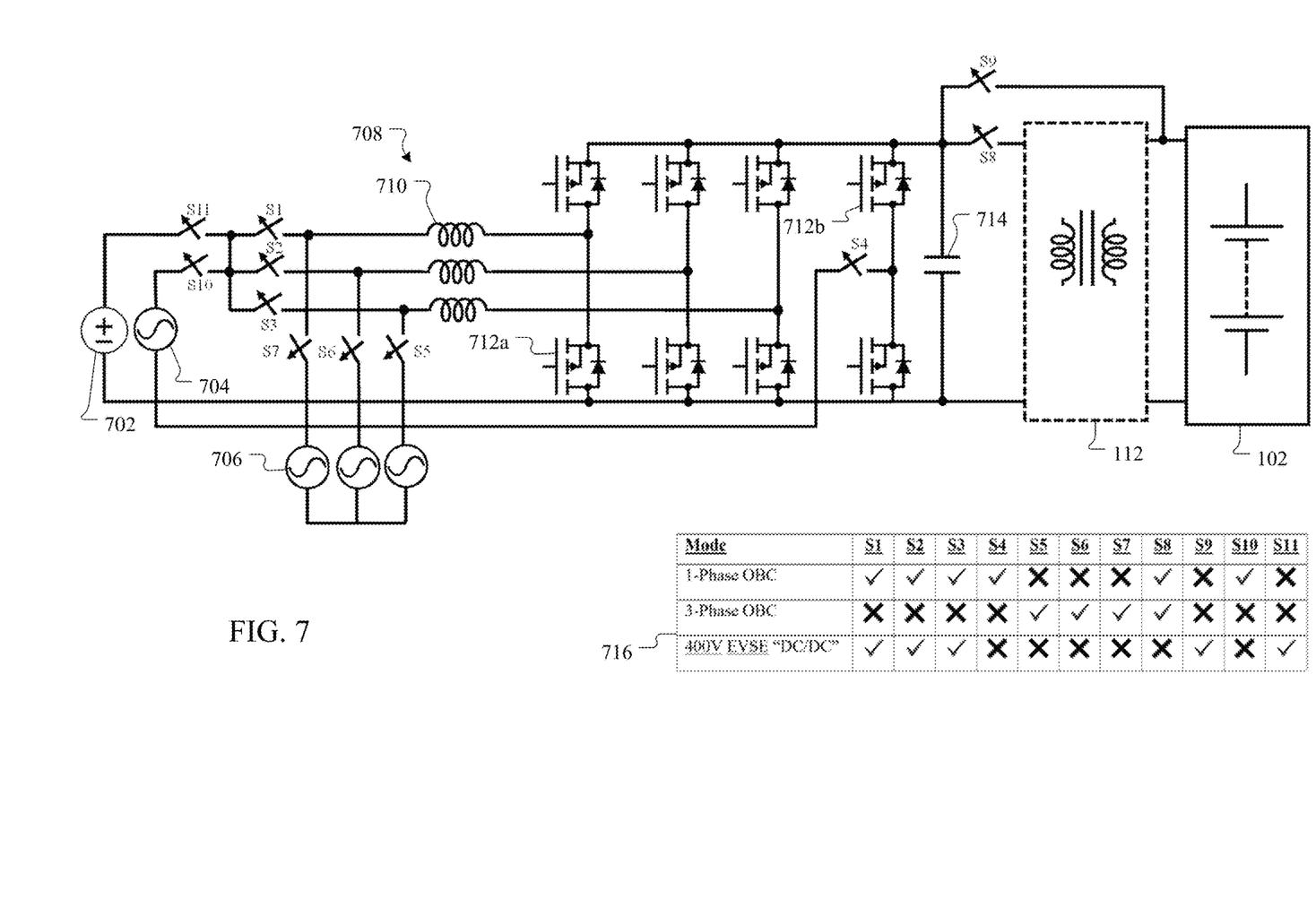
FIG. 7 illustrates another specific example implementation of a vehicle supporting charging of the vehicle's higher-voltage power supply using a lower-voltage charging station according to this disclosure.

FIG. 7 illustrates another specific example implementation of a vehicle 100 supporting charging of the vehicle's higher-voltage power supply 102 using a lower-voltage charging station 130 according to this disclosure. Note that certain components of the vehicle 100 shown in FIGS. 1 through 4 are omitted from FIG. 7 for clarity. As shown in FIG. 7, the vehicle's power supply 102 can be charged using a DC power source 702, which may represent a lower-voltage charging station 130. The vehicle's power supply 102 may also be charged using a single-phase AC power source 704 or a three-phase AC power source 706. A higher-voltage charging station 130 may also be used to charge the power supply 102, but this usage is not represented in FIG. 7 since it does not involve the on-board charger 108.

In this example, a boost PFC converter circuit 708 may have a similar form as the boost PFC converter circuit 602, but the boost PFC converter circuit 708 includes three paths. Each path includes an inductor 710 and a pair of switches 712a (such as MOSFETs or other transistors). In each path, the switches 712a can be used to selectively couple the inductor 710 of that path to one end of an output capacitor 714. Additional switches 712b can be used to selectively couple the single-phase AC power source 704 to one end of the output capacitor 714.

Various switches S1-S11 are also shown in FIG. 7. The switches S1-S11 can be controlled (such as by the controller 126) to reconfigure the boost PFC converter circuit 708 depending on the type of voltage source being used to charge the power supply 102. Table 716 in FIG. 7 illustrates which of the switches S1-S11 can be closed (check mark) and which of the switches S1-S11 can be opened (X mark) depending on the type of voltage source being used to charge the power supply 102. For example, switches S1-S4, S8, and S10 can be closed and switches S5-S7, S9, and S11 can be opened when the power supply 102 is being charged using the single-phase AC power source 704. This configuration of the switches S1-S11 couples the single-phase AC power source 704 to all three paths of the boost PFC converter circuit 708 (via switches S1-S3 and S10) and to a return electrical path (via switch S4). This configuration of the switches S1-S11 also couples the output of the boost PFC converter circuit 708 to the DC/DC converter 112 (via switch S8).

Switches S5-S8 can be closed and switches S1-S4 and S9-S11 can be opened when the power supply 102 is being charged using the three-phase AC power source 706. This configuration of the switches S1-S11 couples the three-phase AC power source 706 to all three paths of the boost PFC converter circuit 708 (via switches S5-S7). This configuration of the switches S1-S11 also couples the output of the boost PFC converter circuit 708 to the DC/DC converter 112 (via switch S8).

Switches S1-S3, S9, and S11 can be closed and switches S4-S8 and S10 can be opened when the power supply 102 is being charged using the DC power source 702 (such as a lower-voltage charging station 130). This configuration of the switches S1-S11 couples the DC power source 702 to all three paths of the boost PFC converter circuit 708 (via switches S1-S3 and S11). This configuration of the switches S1-S11 also couples the output of the boost PFC converter circuit 708 to the power supply 102 while bypassing the DC/DC converter 112 (via switch S9).

Although FIG. 7 illustrates another specific example of an implementation of a vehicle 100 supporting charging of the vehicle's higher-voltage power supply 102 using a lower-voltage charging station 130, various changes may be made to FIG. 7. For example, various components shown in FIG. 7 may be combined, further subdivided, replicated, omitted, or rearranged and additional components may be added according to particular needs. Also, a vehicle 100 need not support all of the various charging modes shown in FIG. 7, such as when the vehicle 100 supports one (but not both) of the AC charging techniques.

Figure 8:
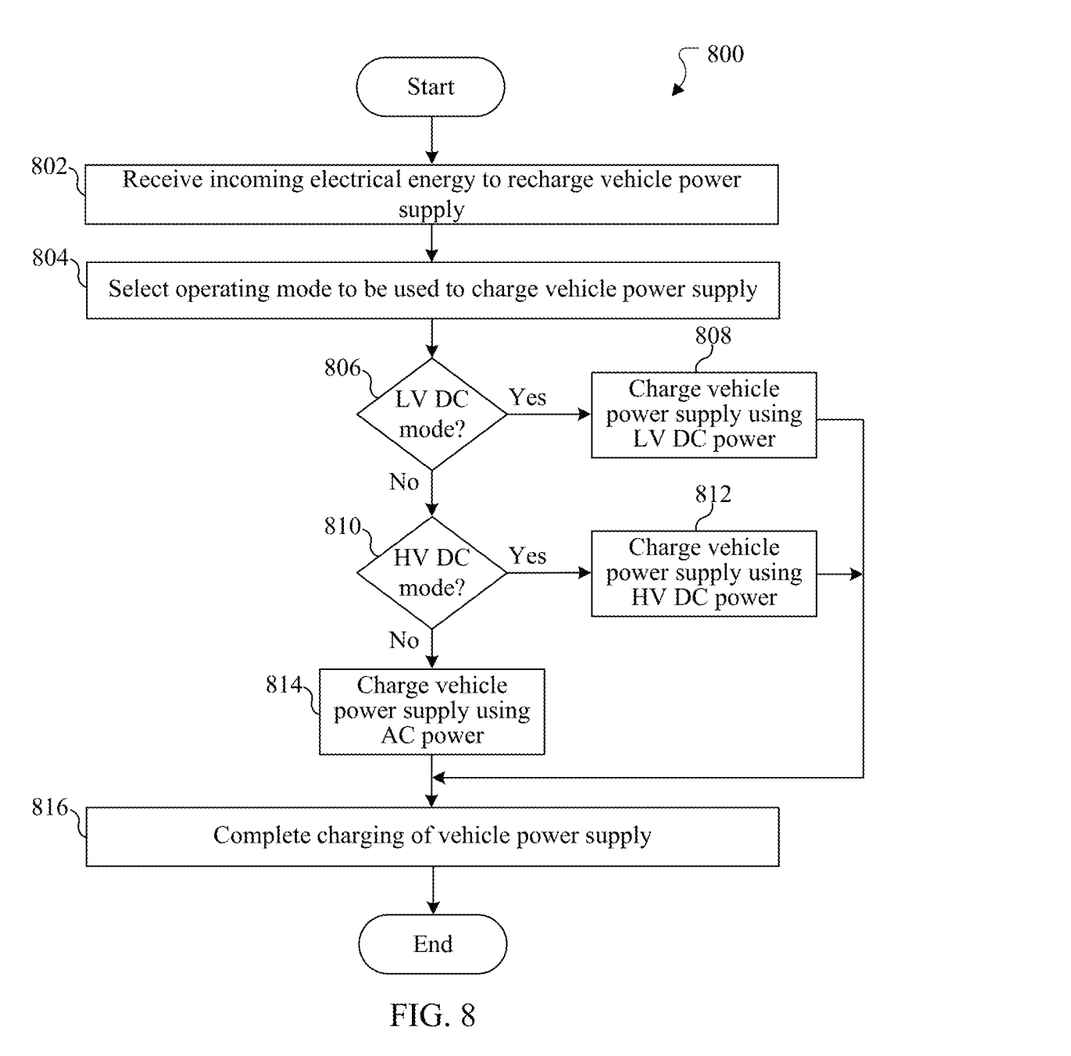
FIG. 8 illustrates an example method for charging a vehicle's power supply according to this disclosure.

FIG. 8 illustrates an example method 800 for charging a vehicle's power supply 102 according to this disclosure. For ease of explanation, the method 800 shown in FIG. 8 is described as being performed using the vehicle 100 of FIG. 1. However, the method 800 may be used by any other suitable vehicle designed in accordance with the teachings of this disclosure (including those shown in FIG. 5 or FIG. 7).

As shown in FIG. 8, incoming electrical energy to recharge a vehicle's power supply is received at step 802. This may include, for example, the vehicle 100 receiving an AC voltage via the AC input 104 or a higher-voltage DC or lower-voltage DC voltage via the DCFC input 106. An operating mode to be used to charge the vehicle's power supply is selected at step 804. This may include, for example, the controller 126 of the vehicle 100 determining whether the vehicle 100 is receiving the AC voltage, the higher-voltage DC voltage, or the lower-voltage DC voltage.

If the operating mode to be used is determined to be lower-voltage DC (LV DC) mode at step 806, the vehicle's power supply is charged using the lower-voltage DC voltage at step 808. This may include, for example, the controller 126 controlling the switches 114-124 so that the AC input 104 is disconnected, the DCFC input 106 is electrically coupled to the PFC converter 110, and the PFC converter 110 is electrically coupled to the power supply 102. In this configuration, the lower-voltage DC voltage being received can be boosted using the PFC converter 110, and the boosted voltage can be used to charge the power supply 102.

If the operating mode to be used is determined to be higher-voltage DC (HV DC) mode at step 810, the vehicle's power supply is charged using the higher-voltage DC voltage at step 812. This may include, for example, the controller 126 controlling the switches 114-124 so that the AC input 104 is disconnected and the DCFC input 106 is electrically coupled to the power supply 102. In this configuration, the higher-voltage DC voltage being received can be used to charge the power supply 102.

Otherwise, the vehicle's power supply is charged using the AC voltage at step 814. This may include, for example, the controller 126 controlling the switches 114-124 so that the AC input 104 is electrically coupled to the on-board charger 108 and the DCFC input 106 is disconnected. In this configuration, the AC voltage being received can be used to charge the power supply 102. Note that while not shown here, an additional determination could be made whether the AC voltage represents a single-phase or three-phase AC electrical signal, and switches (such as the switches S1-S11) can be controlled based on which type of AC electrical signal is being received.

Charging of the vehicle's power supply is completed at step 816. This may include, for example, the controller 126 determining whether the power supply 102 has been charged to its maximum capacity. If so, the controller 126 can disconnect the switches 114-124 so that additional electrical energy is not provided to the power supply 102. Otherwise, the controller 126 may allow charging to continue until the power source is decoupled from the vehicle 100 or the power supply 102 is fully charged.

Although FIG. 8 illustrates one example of a method 800 for charging a vehicle's power supply 102, various changes may be made to FIG. 8. For example, while shown as a series of steps, various steps in FIG. 8 may overlap, occur in parallel, occur in a different order, or occur any number of times.

The above description has often described using the AC/DC PFC converter 110 in a vehicle 100 in order to allow for boosting of a lower-voltage DC input signal received from a lower-voltage charging station 130. However, it should be noted here that the AC/DC PFC converter 110 in the vehicle 100 should he designed to handle the increased electrical power that is associated with coupling the vehicle 100 to a lower-voltage charging station 130. For example, as noted above, the AC/DC PFC converter 110 is typically used to convert an AC electrical signal into a DC electrical signal. Some AC/DC PFC converters 110 may be designed only to handle a relatively low amount of electrical power, such as a power of about 22 kilowatts. Depending on the design of the lower-voltage charging station 130, the lower-voltage charging station 130 may theoretically deliver a larger amount of power, such as between 150 kilowatts and 200 kilowatts or even more. As a result, the AC/DC PFC converter 110 in the vehicle 100 should be designed to handle a larger amount of electrical power than would ordinarily be obtained from an AC power source. Having said that, it is routine for a DC charging station to output less than the theoretical maximum amount of power during charging. For instance, some lower-voltage charging stations 130 may only output around 55 kilowatts of power, even though they may be designed to provide between 150 kilowatts and 200 kilowatts. Because of this, the AC/DC PFC converter 110 in the vehicle 100 can be designed to handle a larger amount of electrical power, but not necessarily the theoretical maximum amount of power that might be obtainable from a charging station.

In some embodiments, various functions described in this patent document are implemented or supported using machine-readable instructions that are stored on a non-transitory machine-readable medium. The phrase "machine-readable instructions" includes any type of instructions, including source code, object code, and executable code. The phrase "non-transitory machine-readable medium" includes any type of medium capable of being accessed by one or more processing devices or other devices, such as a read only memory (ROM), a random access memory (RAM), a Flash memory, a hard disk drive (HDD), or any other type of memory. A "non-transitory" medium excludes wired, wireless, optical, or other communication links that transport transitory electrical or other signals. Non-transitory media include media where data can be permanently stored and media where data can be stored and later overwritten.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect, to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed:

1. An apparatus for charging a power supply, the apparatus comprising:
    an alternating current (AC) connector configured to receive an AC electrical signal from an AC power source;
    a direct current (DC) connector configured to receive a first DC electrical signal having a lower voltage from a lower-voltage DC power source and a second DC electrical signal having a higher voltage from a higher-voltage DC power source;
    an on-board charger configured to charge the power supply using the AC electrical signal, the on-board charger comprising an AC/DC power factor correction (PFC) converter and a DC/DC converter;
    switches configured to selectively form and break electrical connections between the AC connector, the DC connector, the AC/DC PFC converter, the DC/DC converter, and the power supply;
    a controller configured to adjust the electrical connections formed by the switches; and
    one or more sensors configured to detect whether the AC connector is connected to the AC power source, the DC connector is connected to the lower-voltage DC power source, or the DC connector is connected to the higher-voltage DC power source,
    wherein the controller is configured to, in response to a detection using the one or more sensors that the DC connector is connected to the lower-voltage DC power source, place the switches in a first configuration to couple the DC connector to the AC/DC PFC converter and couple the AC/DC PFC converter to the power supply, and
    wherein the controller is configured to, in response to a detection using the one or more sensors that the DC connector is connected to the higher-voltage DC power source, place the switches in a second configuration to couple the DC connector to the power supply.

2. The apparatus of claim 1, wherein the switches in the first configuration bypass the DC/DC converter so that electrical energy flows from the AC/DC PFC converter without passing through the DC/DC converter.

3. The apparatus of claim 1, wherein the controller is configured to, in response to a detection using the one or more sensors that the AC connector is connected to the AC power source, place the switches in a third configuration to couple the AC connector to the AC/DC PFC converter, couple the AC/DC PFC converter to the DC/DC converter, and couple the DC/DC converter to the power supply.

4. The apparatus of claim 1, wherein:
    the AC/DC PFC converter comprises a boost PFC converter circuit, the boost PFC converter circuit comprising an inductor, an additional switch configured to selectively couple the inductor to ground, and an on-off controller configured to control the additional switch; and
    the apparatus further comprises:
        a first control loop configured, when the AC connector receives the AC electrical signal, to provide a first voltage to the on-off controller in order to control a power factor of the boost PFC converter circuit; and
        a second control loop configured, when the DC connector receives the first DC electrical signal having the lower voltage, to provide a second voltage to the on-off controller in order to control voltage boosting by the boost PFC converter circuit.

5. The apparatus of claim 1, wherein the controller is configured to control the switches based on whether the AC electrical signal comprises a single-phase AC electrical signal or a three-phase AC electrical signal.

6. The apparatus of claim 1, wherein:
the power supply has a nominal voltage of approximately 800 volts;
the lower-voltage DC power source is a 400-volt charging station;
the higher-voltage DC power source is an 800-volt charging station; and
the controller is configured to, using the one or more sensors, adjust the electrical connections formed by the switches such that
(i) the DC connector is coupled to the power supply when the DC connector is coupled to the 800-volt charging station and
(ii) the DC connector is coupled to the AC/DC PFC converter and the AC/DC PFC converter is coupled to the power supply when the DC connector is coupled to the 400-volt charging station.

7. An electric vehicle comprising:
at least one electric motor;
a power supply configured to provide electrical energy to the at least one electric motor;
an alternating current (AC) connector configured to receive an AC electrical signal from an AC power source;
a direct current (DC) connector configured to receive a first DC electrical signal having a lower voltage from a lower-voltage DC power source and a second DC electrical signal having a higher voltage from a higher-voltage DC power source;
an on-board charger configured to charge the power supply using the AC electrical signal, the on-board charger comprising an AC/DC power factor correction (PFC) converter and a DC/DC converter;
switches configured to selectively form and break electrical connections between the AC connector, the DC connector, the AC/DC PFC converter, the DC/DC converter, and the power supply;
a controller configured to adjust the electrical connections formed by the switches; and
one or more sensors configured to detect whether the AC connector is connected to the AC power source, the DC connector is connected to the lower-voltage DC power source, or the DC connector is connected to the higher-voltage DC power source,
wherein the controller is configured to, in response to a detection using the one or more sensors that the DC connector is connected to the lower-voltage DC power source, place the switches in a first configuration to couple the DC connector to the AC/DC PFC converter and couple the AC/DC PFC converter to the power supply, and
wherein the controller is configured to, in response to a detection using the one or more sensors that the DC connector is connected to the higher-voltage DC power source, place the switches in a second configuration to couple the DC connector to the power supply.

8. The electric vehicle of claim 7, wherein the switches in the first configuration bypass the DC/DC converter when the first DC electrical signal is used to charge the power supply.

9. The electric vehicle of claim 7, wherein the controller is configured to, in response to a detection using the one or more sensors that the AC connector is connected to the AC power source, place the switches in a third configuration to couple the AC connector to the AC/DC PFC converter, couple the AC/DC PFC converter to the DC/DC converter, and couple the DC/DC converter to the power supply.

10. The electric vehicle of claim 7, wherein:
the AC/DC PFC converter comprises a boost PFC converter circuit, the boost PFC converter circuit comprising an inductor, an additional switch configured to selectively couple the inductor to ground, and an on-off controller configured to control the additional switch; and
the electric vehicle further comprises:
a first control loop configured, when the AC connector receives the AC electrical signal, to provide a first voltage to the on-off controller in order to control a power factor of the boost PFC converter circuit; and
a second control loop configured, when the DC connector receives the first DC electrical signal having the lower voltage, to provide a second voltage to the on-off controller in order to control voltage boosting by the boost PFC converter circuit.

11. The electric vehicle of claim 7, wherein the controller is configured to control the switches based on whether the AC electrical signal comprises a single-phase AC electrical signal or a three-phase AC electrical signal.

12. The electric vehicle of claim 7, wherein:
the power supply has a nominal voltage of approximately 800 volts;
the lower-voltage DC power source is a 400-volt charging station;
the higher-voltage DC power source is an 800-volt charging station; and
the controller is configured to, using the one or more sensors, adjust the electrical connections formed by the switches such that (i) the DC connector is coupled to the power supply when the DC connector is coupled to the 800-volt charging station and (ii) the DC connector is coupled to the AC/DC PFC converter and the AC/DC PFC converter is coupled to the power supply when the DC connector is coupled to the 400-volt charging station.

13. The electric vehicle of claim 7, further comprising:
one or more first components configured to remain powered while the power supply is charged using any of the AC electrical signal, the first DC electrical signal having the lower voltage, and the second DC electrical signal having the higher voltage; and
one or more second components configured to be selectively powered depending on whether the power supply is charged using the AC electrical signal, the first DC electrical signal having the lower voltage, or the second DC electrical signal having the higher voltage.

14. The electric vehicle of claim 13, wherein:
the one or more first components comprise at least one heating, air conditioning, and ventilation (HVAC) compressor or heater; and
the one or more second components comprise one or more vehicle accessories.

15. A method comprising:
determining, using one or more sensors, whether an alternating current (AC) connector is connected to an AC power source to receive an AC electrical signal, a direct current (DC) connector is connected to a lower-voltage DC power source to receive a first DC electrical signal having a lower voltage, or the DC connector is connected to a higher-voltage DC power source to receive a second DC electrical signal having a higher voltage; and based on the determination using the one or more sensors, controlling switches to selectively form and break electrical connections between the AC connector, the DC connector, an AC/DC power factor correction (PFC) converter of an on-board charger, a DC/DC converter of the on-board charger, and a power supply, wherein controlling the switches comprises, in response to a determination using the one or more sensors that the DC connector is connected to the lower-voltage DC power source, placing the switches in a first configuration to couple the DC connector to the AC/DC PFC converter and couple the AC/DC PFC converter to the power supply, and wherein controlling the switches comprises, in response to a determination using the one or more sensors that the AC connector is connected to the AC power source, placing the switches in a third configuration to couple the AC connector to the AC/DC PFC converter, coupling the AC/DC PFC converter to the DC/DC converter, and coupling the DC/DC converter to the power supply.

16. The method of claim 15, wherein controlling the switches comprises, in response to a determination using the one or more sensors that the DC connector is connected to the higher-voltage DC power source, placing the switches in a second configuration to couple the DC connector to the power supply.

17. The method of claim 15, wherein:

the power supply has a nominal voltage of approximately 800 volts;

the lower-voltage DC power source is a 400-volt charging station;

the higher-voltage DC power source is an 800-volt charging station; and the switches are controlled such that (i) the DC connector is coupled to the power supply when the DC connector is coupled to the 800-volt charging station and (ii) the DC connector is coupled to the AC/DC PFC converter and the AC/DC PFC converter is coupled to the power supply when the DC connector is coupled to the 400-volt charging station.

* * * * *